(12) United States Patent
Seo et al.

(10) Patent No.: US 10,057,563 B2
(45) Date of Patent: Aug. 21, 2018

(54) IMAGE PICK-UP APPARATUS, PORTABLE TERMINAL HAVING THE SAME AND IMAGE PICK-UP METHOD USING APPARATUS

(71) Applicant: LG Innotek Co., Ltd., Seoul (KR)

(72) Inventors: Eun Sung Seo, Seoul (KR); Young Woon Kim, Seoul (KR); Young Seop Moon, Seoul (KR); Yu Kyeong Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/974,952

(22) Filed: Dec. 18, 2015

(65) Prior Publication Data

US 2016/0182896 A1 Jun. 23, 2016

(30) Foreign Application Priority Data

Dec. 18, 2014 (KR) ........................ 10-2014-0183281

(51) Int. Cl.
*H04N 5/232* (2006.01)
*G03B 13/00* (2006.01)
(Continued)

(52) U.S. Cl.
CPC ......... *H04N 13/0296* (2013.01); *G06T 7/593* (2017.01); *G06T 7/80* (2017.01);
(Continued)

(58) Field of Classification Search
CPC ............ H04N 5/3696; H04N 5/23209; H04N 5/23212; H04N 2209/042; H04N 9/045; H04N 9/077
(Continued)

(56) References Cited

U.S. PATENT DOCUMENTS

2012/0293706 A1  11/2012  Usui
2012/0327267 A1*  12/2012  Takahara ................. G02B 7/34
                                                  348/231.99
(Continued)

FOREIGN PATENT DOCUMENTS

JP        2009124313 A    6/2009
WO   WO-2009/102044 A1   8/2009

OTHER PUBLICATIONS

European Search Report dated May 6, 2016 in European Application No. 15200753.0.

*Primary Examiner* — Kelly L Jerabek
(74) *Attorney, Agent, or Firm* — Saliwanchik, Lloyd & Eisenschenk

(57) ABSTRACT

Embodiments provide an image pick-up apparatus including an optical unit configured to output optical information acquired from a lens having a fixed focal distance, an image sensor unit configured to convert the optical information into electrical signals and including a plurality of phase difference detection pixels, an image information processing unit configured to generate interest image information by processing the electrical signals converted by the image sensor unit, a memory unit configured to store depth values matched with reference image information, a calculation unit configured to extract the depth value matched with the reference image information corresponding to the interest image information, and an image information output unit configured to output the depth value extracted by the calculation unit and, thus, depth information may be easily acquired using only one image pick-up apparatus.

20 Claims, 11 Drawing Sheets

(51) Int. Cl.
*H04N 13/02* (2006.01)
*G06T 7/80* (2017.01)
*G06T 7/593* (2017.01)

(52) U.S. Cl.
CPC ..... *H04N 5/23212* (2013.01); *H04N 13/0225* (2013.01); *H04N 13/0271* (2013.01); *G06T 2207/10028* (2013.01)

(58) Field of Classification Search
USPC .................................................. 348/345–357
See application file for complete search history.

(56) References Cited

U.S. PATENT DOCUMENTS

| | | | |
|---|---|---|---|
| 2014/0022614 A1* | 1/2014 | Endo | H04N 5/23212 358/505 |
| 2015/0181194 A1* | 6/2015 | Izawa | G02B 7/34 348/49 |
| 2015/0187083 A1* | 7/2015 | Yoon | H04N 5/23212 382/106 |
| 2015/0244929 A1* | 8/2015 | Lee | H04N 5/23222 348/346 |
| 2016/0037103 A1* | 2/2016 | Seo | H04N 5/23212 348/302 |
| 2016/0044229 A1* | 2/2016 | Hamada | G02B 7/346 348/349 |
| 2016/0065870 A1* | 3/2016 | Pyeoun | H04N 5/369 348/302 |
| 2016/0127636 A1* | 5/2016 | Ito | G06F 3/04845 348/333.12 |

* cited by examiner

10A 10A-1   10A-2

10B 10B-1   10B-2

10A            10B

13

11

15

(a)

(b)

c)

(a)

(b)

c)

(a)

(b)

(c)

IMAGE PICK-UP APPARATUS, PORTABLE TERMINAL HAVING THE SAME AND IMAGE PICK-UP METHOD USING APPARATUS

CROSS REFERENCE TO RELATED APPLICATION

This application claims priority under 35 U.S.C. § 119 to Korean Patent Application No. 10-2014-0183281, filed Dec. 18, 2014, which is hereby incorporated by reference in its entirety.

TECHNICAL FIELD

Embodiments relate to an image pick-up apparatus having phase difference detection pixels, a portable terminal having the same and an image pick-up method using the image pick-up apparatus having phase difference detection pixels.

BACKGROUND

In general, in order to acquire a distance from an image of an imaging apparatus to a subject in a 3D spatial depth map, i.e., in a 3D space, a stereo camera method, a laser scanning method, a Time of Flight (TOF) method, etc. are known.

Thereamong, the stereo camera method is carried out by executing a process of three-dimensionally recognizing a subject using two human eyes through hardware. One subject is captured by two cameras and depth (or distance) information in a space is extracted through an analysis process of a pair of acquired images.

In order to acquire distance information using a stereo camera, two cameras are required and distance or depth information may be acquired by calculating disparity between images respectively acquired from the two cameras on the same epipolar line.

However, since the two cameras respectively acquire images and depth or distance information may be acquired by measuring a matching degree between the two images, conventional depth map extraction requires precise alignment of the two cameras.

Further, although the two cameras are aligned at proper positions, geometric information, such as rotations, translations, focal distances, skew angles, and principle points of the two cameras, is required. After the epipolar lines of two images acquired from the two cameras based on the geometric information are coincided with each other, distance information may be acquired.

In order to acquire distance information through the above method using two cameras, a plurality of calibration processes is required and, in order to acquire accurate distance information, calibration needs to be performed again whenever mechanical deformation is generated due to environmental change.

BRIEF SUMMARY

Embodiments provide an image pick-up apparatus which detects a depth value using image information acquired through phase difference detection pixels of an image sensor unit, an image pick-up method for outputting a depth value using the same, and a portable terminal using the apparatus.

In one embodiment, an image pick-up apparatus includes an optical unit configured to output optical information acquired from a lens having a fixed focal distance, an image sensor unit configured to convert the optical information into electrical signals and including a plurality of phase difference detection pixels, an image information processing unit configured to generate interest image information by processing the electrical signals converted by the image sensor unit, a memory unit configured to store depth values matched with reference image information, a calculation unit configured to extract the depth value matched with the reference image information corresponding to the interest image information, and an image information output unit configured to output the depth value extracted by the calculation unit.

The phase difference detection pixels may include first group pixels, each having a shielded region deviated to one side thereof, and second group pixels, each having a shielded region deviated to the other side thereof.

The interest image information may include a phase difference between a first electrical signal of the first group pixels and a second electrical signal of the second group pixels having the same luminous intensity level.

The first group pixels may be separated from each other by a designated interval in the row direction and disposed in a first arrangement line, the second group pixels may be separated from each other by a designated interval in the row direction and disposed in a second arrangement line, and the first arrangement line and the second arrangement line may intersect each other in the column direction.

The image sensor unit may further include a plurality of image detection pixels disposed in a lattice pattern together with the phase difference detection pixels.

The image information output unit may output image information generated by the image detection pixels.

The image information output unit may output a depth map including the depth value extracted by the calculation unit.

In another embodiment, a portable terminal includes an optical unit configured to output optical information acquired from a lens having a fixed focal distance, an image sensor unit configured to convert the optical information into electrical signals and including a plurality of phase difference detection pixels, an image information processing unit configured to generate interest image information by processing the electrical signals converted by the image sensor unit, a memory unit configured to store depth values matched with reference image information, a calculation unit configured to extract the depth value matched with the reference image information corresponding to the interest image information, an image information output unit configured to output the depth value extracted by the calculation unit, and a display device configured to display an image including the depth value output from the image information output unit.

The phase difference detection pixels may include first group pixels, each having a shielded region deviated to one side thereof, and second group pixels, each having a shielded region deviated to the other side thereof.

The interest image information may include a phase difference between a first electrical signal of the first group pixels and a second electrical signal of the second group pixels having the same luminous intensity level.

The first group pixels may be separated from each other by a designated interval in the row direction and disposed in a first arrangement line, the second group pixels may be separated from each other by a designated interval in the row direction and disposed in a second arrangement line, and the first arrangement line and the second arrangement line may intersect each other in the column direction.

The image sensor unit may further include a plurality of image detection pixels disposed in a lattice pattern together with the phase difference detection pixels.

The image information output unit may output image information generated by the image detection pixels.

In yet another embodiment, an image pick-up method using an image pick-up apparatus including an optical unit configured to output optical information acquired from a lens having a fixed focal distance, an image sensor unit configured to convert the optical information into electrical signals and including a plurality of phase difference detection pixels, an image information processing unit configured to generate interest image information by processing the electrical signals converted by the image sensor unit, a memory unit configured to store depth values matched with reference image information, a calculation unit configured to extract the depth value matched with the reference image information corresponding to the interest image information, and an image information output unit configured to output the depth value extracted by the calculation unit, includes acquiring optical information, converting the optical information into electrical signals, processing the converted electrical signals to generate the interest image information, extracting a corresponding depth value by comparing the interest image information with the reference image information stored in the memory, and providing the extracted depth value.

In provision of the extracted depth value, a depth map using the extracted depth value may be provided.

The phase difference detection pixels may include first group pixels, each having a shielded region deviated to one side thereof, and second group pixels, each having a shielded region deviated to the other side thereof.

The interest image information may include a phase difference between a first electrical signal of the first group pixels and a second electrical signal of the second group pixels having the same luminous intensity level.

The first group pixels may be separated from each other by a designated interval in the row direction and disposed in a first arrangement line, the second group pixels may be separated from each other by a designated interval in the row direction and disposed in a second arrangement line, and the first arrangement line and the second arrangement line may intersect each other in the column direction.

The image sensor unit may further include a plurality of image detection pixels disposed in a lattice pattern together with the phase difference detection pixels.

The image information output unit may output a depth map including the depth value extracted by the calculation unit.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
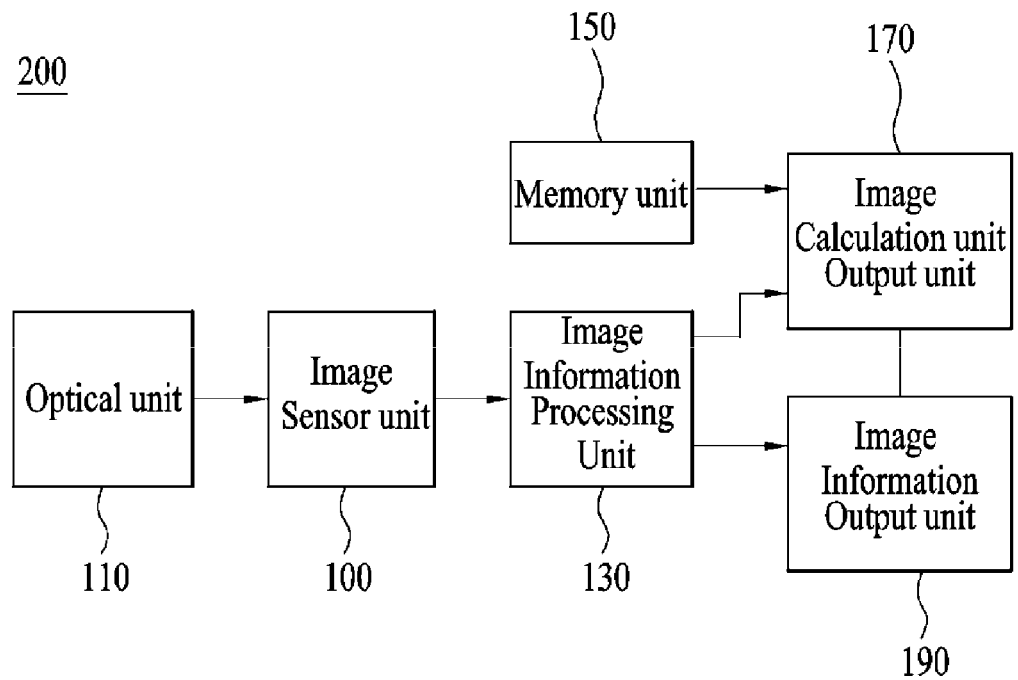
FIG. 1 is a block diagram of an image pick-up apparatus in accordance with one embodiment.

Hereinafter, exemplary embodiments to concretely realize the above objects will be described in detail with reference to the accompanying drawings.

In the following description of the embodiments, relational terms "first", "second", "on/above/upper" and "under/below/lower" used in description of the embodiments do not necessarily require or imply physical or logical relations between substances and elements or order thereof but may be used only to distinguish one substance or element from other substances or elements.

In the drawings, thicknesses or sizes of respective elements may be exaggerated, omitted, or schematically illustrated for convenience and clarity of description. Further, the sizes of the respective elements do not mean actual sizes thereof.

FIG. 1 is a block diagram of an image pick-up apparatus in accordance with one embodiment.

An image pick-up apparatus 200 shown in FIG. 1 may include an optical unit 110, an image sensor unit 100, an image information processing unit 130, a memory unit 150, a calculation unit 170 and an image information output unit 190.

The optical unit 110 may include a plurality of lenses and, in order to acquire an image of a subject, absorb light incident from the outside and output the absorbed light to the image sensor unit 100. That is, the optical unit 110 may output optical information acquired from the lens.

Figure 2:
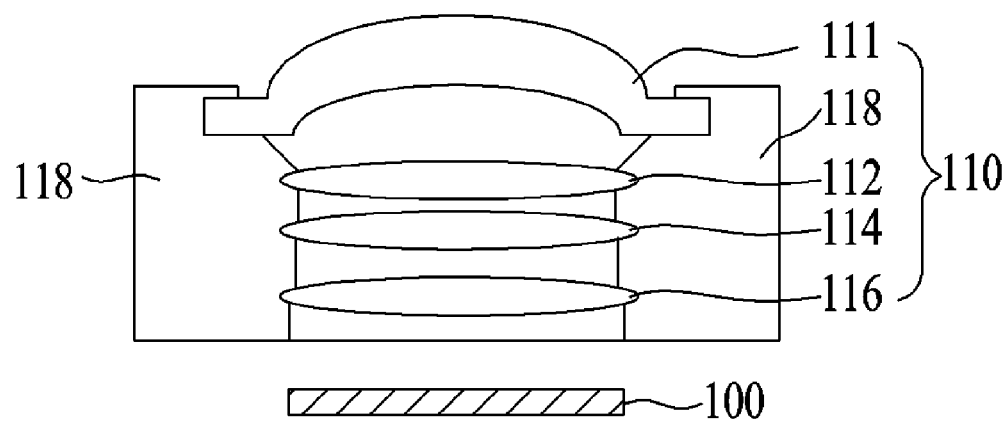
FIG. 2 is a view of an optical unit in accordance with one embodiment.

FIG. 2 is a view illustrating the optical unit 110 in accordance with one embodiment.

Although FIG. 2 illustrates four lenses 111, 112, 114 and 116 disposed in a lens barrel 118, the number of lenses forming the optical unit 110 is not limited thereto but one lens or a plurality of lenses may be disposed in the optical unit 110.

The lenses 111, 112, 114 and 116 may be sequentially stacked and spacers (not shown) may be interposed between the lenses 111, 112, 114 and 116. The spacers may space the lenses 111, 112, 114 and 116 from one another and thus maintains intervals among the lenses 111, 112, 114 and 116.

The lens barrel 118 may have a cylindrical or square pillar shape but is not limited thereto.

The optical unit 110 of this embodiment may include a lens having a fixed focal distance.

That is, the lens barrel 118 may be fixed to a specific position within the optical unit 110 and movement of the lens barrel 118 for focusing may not be executed.

Further, at least one of the lenses 111, 112, 114 and 116 of the optical unit 110 may focus light on the image sensor unit 100.

Here, the lenses 111, 112, 114 and 116 may receive a large amount of light from one point of a subject and refract incident light so as to focus the received light on one point.

Such light focused on one point may form one image and, if one image is formed by focusing light on one point on the image sensor unit 100, it may be judged that the subject is located at the focal distance of the lens.

Optical information output from the optical unit 110 may be transmitted to the image sensor unit 100.

The image sensor unit 100 may include an image sensor which receives optical information of a subject incident through the lenses 111, 112, 114 and 116 of the optical unit 110 and executes photoelectric conversion of the optical information into electrical signals. The image sensor of the image sensor unit 100 may be a Charge Coupled Device (CCD) sensor or a Complementary Metal-Oxide Semiconductor (CMOS) sensor.

The image sensor unit 100 may include a plurality of phase difference detection pixels.

Figure 3A:
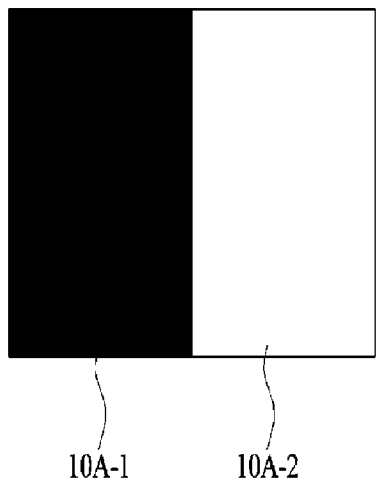
FIGS. 3A and 3B are views illustrating phase difference detection pixels in accordance with one embodiment.
Figure 3A:
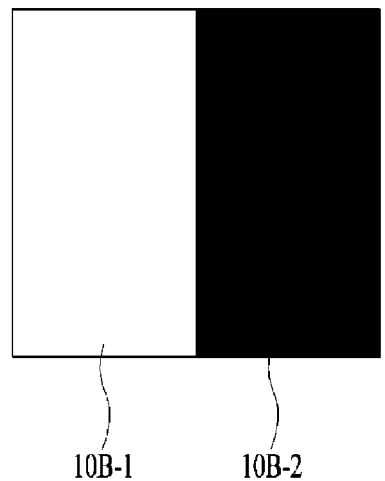

FIG. 3A is a plan view illustrating phase difference detection pixels 10 in accordance with one embodiment.

The phase difference detection pixel 10 may have a light receiving area having a part of regions, acquired by vertically dividing an opening of the pixel 10, in which light is shielded. Here, the shielded regions 10A-1 and 10B-1 of the phase difference detection pixels 10 may be deviated in different directions.

For example, the phase difference detection pixels 10 may include first group pixels 10A, each of which has a shielded region deviated to the left, second group pixels 10B, each of which has a shielded region deviated to the right.

Figure 3B:
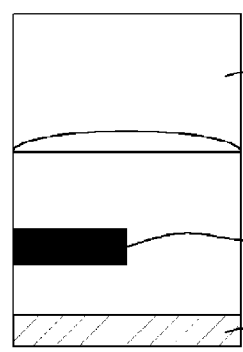
Figure 3B:
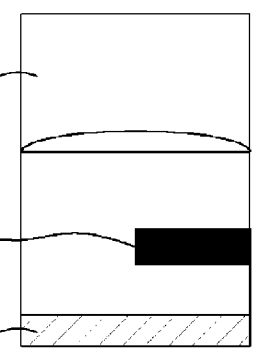

FIG. 3B is a view schematically illustrating configurations of the phase difference detection pixels 10A and 10B.

Each of the phase difference detection pixels 10A and 10B may include a mask layer 11, a micro-lens 13, and a photodiode 15.

The mask layer 11 may form the shielded regions of the phase difference detection pixels 10A and 10B.

The mask layer 11 may be implemented as a metal mask and divide the opening, through which light is incident, and the shielded region, in which light is shielded, from each other.

For example, the amount of light incident upon the photodiode 15 of the image sensor unit 100 may be adjusted according to the area of the shielded region, shielded by the mask layer 11.

The micro-lens 13 may focus an incident optical signal on the central part of the phase difference detection pixel 10A or 10B so as to transmit the optical signal to the photodiode 15. In order to focus the incident optical signal on the phase difference detection pixel 10A or 10B, the relative position of the micro-lens 13 to the photodiode 15 may be changed.

The photodiode 15 may convert the incident optical signal into an electrical signal.

As exemplarily shown in FIG. 3B in brief, light incident upon each of the first group pixel 10A and the second group pixel 10B is focused through the micro-lens 13 and transmits the optical signal to each photo-diode 15 through the light receiving area with no the mask layer 11 and, thereby, a pair of images for detection of a phase difference may be acquired.

Although FIGS. 3A and 3B illustrate the phase difference detection pixels 10A and 10B in accordance with one embodiment, the phase difference detection pixels 10 are not limited to the above shape but may be phase difference detection pixels, each of which has a light receiving area having a part of regions, acquired by horizontally dividing an opening of the pixel 10, in which light is shielded. Here, the shielded regions 10A-1 and 10B-1 of the phase difference detection pixels 10 may be deviated in different directions.

Figure 4:
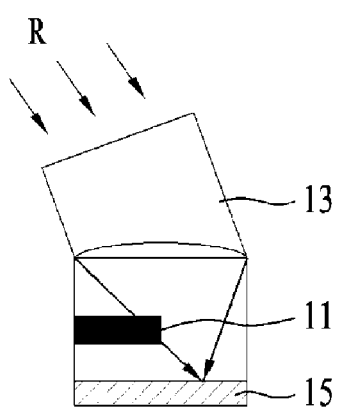
FIG. 4 is a view illustrating an operating method of a phase difference detection pixel in brief.
Figure 4:
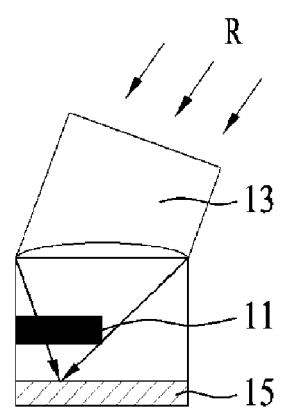

FIG. 4 is a view illustrating an operating method of the first group pixel 10A among the phase difference detection pixels 10 having the above-described configuration.

With reference to FIG. 4, if a left region of the phase difference detection pixel 10A is shielded, when light R is incident from the left of the phase difference detection pixel 10A, the micro-lens 13 moves so as to focus the light R on the center of the image sensor unit 100, and the light focused by the micro-lens 13 is concentrated on the right portion of the photodiode 15 of the phase difference detection pixel 10A. Here, since the shielded region is deviated in the light incident direction, incident light is not shielded and a large amount of the incident light may be supplied to the photodiode 15.

Differently, when light R is incident from the right of the same phase difference detection pixel 10A, the incident light is focused on the left portion of the photodiode 15 by the micro-lens 13. In this case, the shielded region is deviated in the light focusing direction and thus a large amount of the incident light is shielded.

Electrical signals converted by the image sensor unit 100 including the phase difference detection pixels 10 may be supplied to the image information processing unit 130.

The image information processing unit 130 may generate image information from the electrical signals supplied from the image sensor unit 100 and supply the generated information to the image information output unit 190.

The image information generated from the electrical signals converted by the image sensor unit 100 may include image information acquired by processing an optical signal supplied to the first group pixels 10A and image information acquired by processing an optical signal supplied to the second group pixels 10B, and further include information acquired by extracting a phase difference value from the image information of the two group pixels 10A and 10B.

On the assumption that image information generated by the image information processing unit 130 is referred to as interest image information, for example, such interest image information may include a phase difference between a first electrical signal of the first group pixels 10A and a second electrical signal of the second group pixels 10B having the same luminous intensity level.

The memory unit 150 may store depth values matched with reference image information.

Here, reference image information corresponds to, in an image pick-up apparatus having an image sensor unit including phase difference detection pixels, a data value in which a phase difference value between images in a pair acquired from the phase difference detection pixels having different shielded regions is matched with a distance between the image pick-up apparatus having such a phase difference value and a subject and then stored.

The reference image information stored in the memory unit 150 and a depth value matched with the reference image information may be stored as a look-up table.

Data of the look-up table stored in the memory unit 150 may be a stored data value of an image pick-up apparatus having an optical unit including a fixed focus lens, focal distance information of which is given.

For example, among image information acquired by capturing a subject, separated from the focal distance of a fixed focus lens and having given distance information, image information acquired from different phase difference detection pixel groups, i.e., a phase difference value, may be calculated, matched with the distance information of the subject and then stored as data.

The image pick-up apparatus 200 in accordance with this embodiment may further include the calculation unit 170 to extract a depth value corresponding to the interest image information processed by the image information processing unit 130.

The interest image information processed by the image information processing unit 130 may be a phase difference value acquired through comparison between image information of the first group pixels 10A and image information of the second group pixels 10B.

Such interest image information may be compared with the reference image information value stored in the memory unit 150 and a depth value of the interest image information may extracted by searching for a depth value matched with the reference image information coinciding with the interest image information from data stored in the memory unit 150.

Therefore, in order to acquire depth information of the subject, the calculation unit 170 may compare the interest image information with the data stored in the memory unit 150, judge a result of comparison and search for and extract a corresponding depth value.

The image information output unit 190 may output the depth value extracted by the calculation unit 170.

The image information output unit 190 may transmit the depth value to an external device.

Further, the image information output unit 190 may display image information in which the depth value supplied from the image information processing unit 130 is reflected.

The image information output unit 190 may provide visual image information to a user and, in order to display such image information, include a display including a liquid crystal display (LCD) panel or an organic light emitting diode (OLED) panel.

The image information displayed through the image information output unit 190 may be a depth map image in which the depth value is reflected, or image information including the same may be displayed.

Figure 5A:
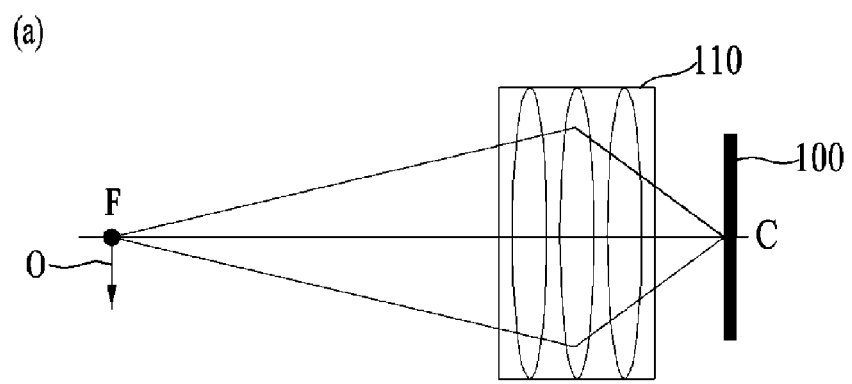
FIGS. 5A to 5C are views illustrating relations between a distance to a subject and image information generated by phase difference detection pixels.
Figure 5A:
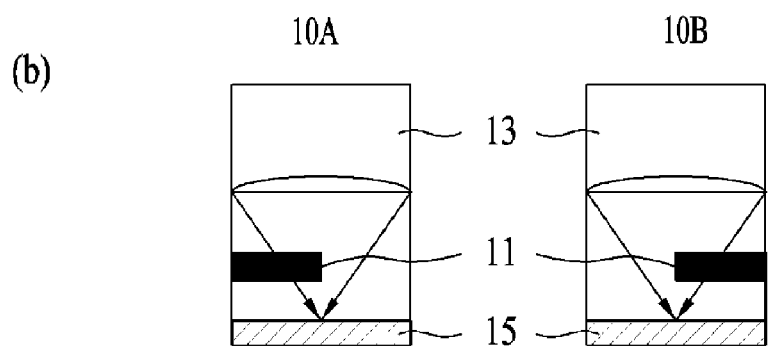
Figure 5A:
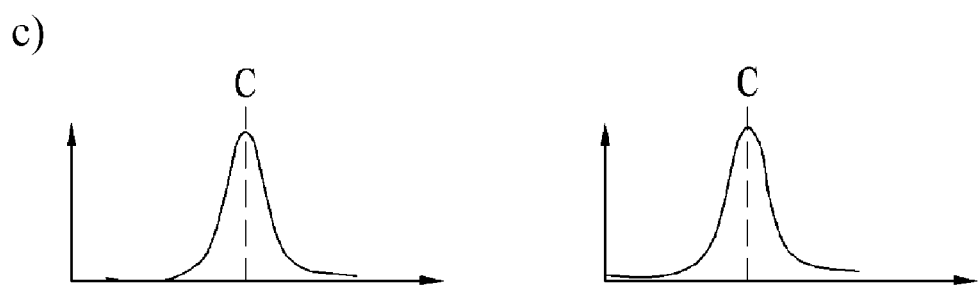
Figure 5B:
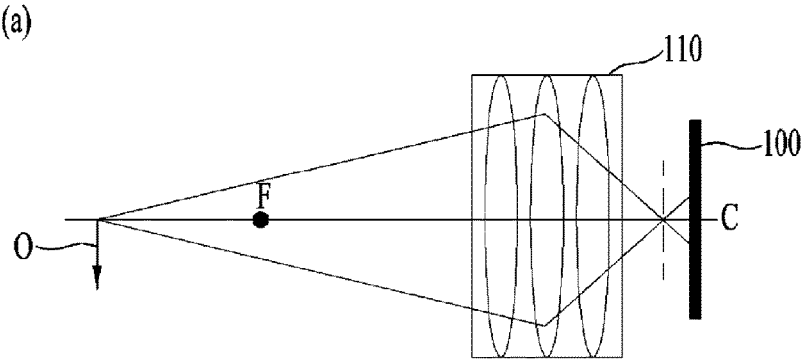
Figure 5B:
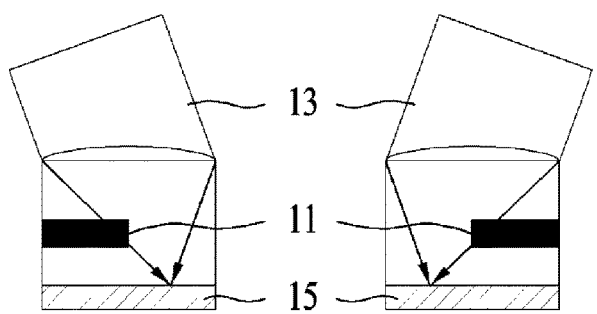
Figure 5B:
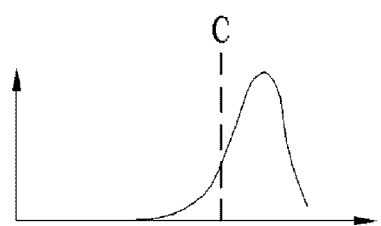
Figure 5B:
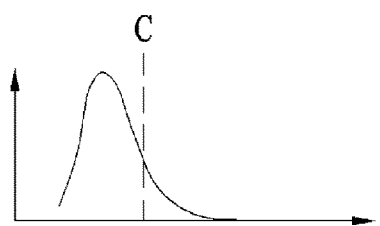
Figure 5C:
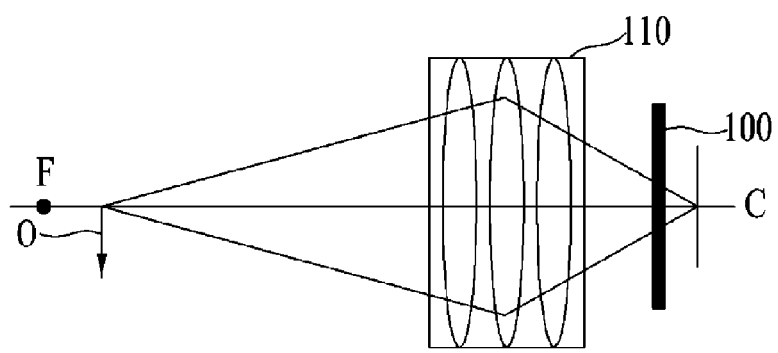
Figure 5C:
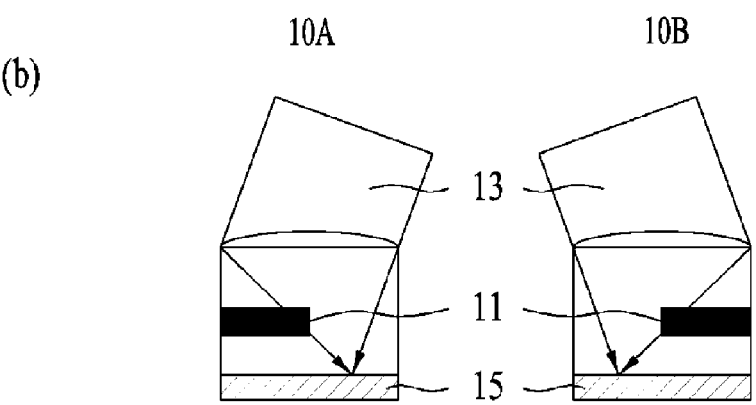
Figure 5C:
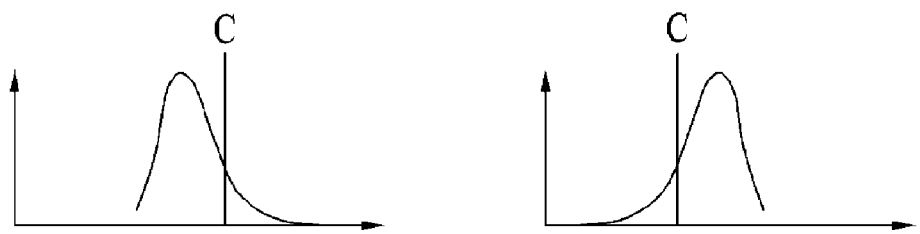

FIGS. 5A to 5C are views illustrating relations between a distance to a subject and image information generated by the image sensor unit 100 in the image pick-up apparatus 200 including the phase difference detection pixels 10A and 10B in accordance with this embodiment. That is, FIGS. 5A to 5C illustrate a principle of extracting depth information in the image pick-up apparatus 200 in accordance with this embodiment in brief.

FIG. 5A illustrates a case in that a subject O is located at a focal position F.

With reference to (a) of FIG. 5A, light from the subject O having passed through the optical unit 110 including a plurality of lenses is focused on the image sensor unit 100. In the case of FIG. 5A, the position of the subject O coincides with the focal position F and, thus, light acquired by the optical unit 110 is focused on one point on the image sensor unit 100.

(c) of FIG. 5A illustrates luminous intensity distributions of optical information acquired by the phase difference detection pixels 10A and 10B of the image sensor unit 100.

It may be understood that, if the subject O is located at the focal position F, as exemplarily shown in FIG. 5A, luminous intensity value distributions of optical information supplied to the two phase difference detection pixel groups 10A and 10B are the same.

That is, since light is focused on the center of the image sensor unit 100, disposition of the micro-lenses 13 of the phase difference detection pixels 10A and 10B is not changed and, thus, the same optical information may be acquired regardless of directions of the shielded regions of the phase difference detection pixels 10A and 10B.

Therefore, it may be understood that, if two images acquired from the phase difference detection pixels 10A and 10B having different shielded regions coincide with each other, the subject O is located at a position F separated from the image pick-up apparatus by the focal distance of the lens.

FIG. 5B illustrates a case in that a subject O is located at a position more distant from the image pick-up apparatus than the focal position F and, in this case, an image of the subject O is focused at a point in front of the position of the image sensor unit 100 and unfocused images are formed on the image sensor unit 100.

With reference to (a) of FIG. 5B, among light output from the optical unit 110, a light beam disposed at the left of the optical unit 110 (disposed at the lower region in this figure) is supplied to the right portion of the image sensor unit 100 and a light beam disposed at the right of the optical unit 110 (disposed at the upper region in this figure) is supplied to the left portion of the image sensor unit 100.

For example, in the case of FIG. 5B, the micro-lenses 13 of the phase difference detection pixels 10A and 10B move due to the operating principle of the phase difference detection pixels 10A and 10B described above with reference to FIG. 4. Here, since light is focused on the central regions of the photodiodes 15 by the micro-lenses 13 of the phase difference detection pixels 10A and 10B, optical information supplied to the first group pixels 10A has a high luminous intensity value at pixels disposed at the right region of the image sensor unit 100 and, on the other hand, optical information supplied to the second group pixels 10B has a high luminous intensity value at pixels disposed at the left region of the image sensor unit 100.

That is, as exemplarily shown in (c) of FIG. 5B, optical information supplied to the phase difference detection pixel 10A and optical information supplied to the phase difference detection pixel 10B have luminous intensity distributions leaned in opposite directions based on the central pixel C of the image sensor unit 100.

Therefore, in the case of FIG. 5B, since light is not focused on one point on the image sensor unit 100, two unfocused images are generated, a phase difference may be acquired from the two images, and distance information of the subject O separated from the optical unit 110 may be acquired from the phase difference value between the two images.

FIG. 5C illustrates a case in that a subject O is located at a position closer to the image pick-up apparatus than the focal position F. Here, a focused image is formed at a position in the rear of the position of the image sensor unit 100 and unfocused images are formed on the image sensor unit 100.

With reference to (a) of FIG. 5C, among light output from the optical unit 110, a light beam disposed at the left of the optical unit 110 (disposed at the lower region in this figure) is supplied to the left portion of the image sensor unit 100 and a light beam disposed at the right of the optical unit 110 (disposed at the upper region in this figure) is supplied to the right portion of the image sensor unit 100.

For example, in the case of FIG. 5C, the micro-lenses 13 of the phase difference detection pixels 10A and 10B also move. Contrary to the case of FIG. 5B, optical information supplied to the first group pixels 10A has a high luminous intensity value at pixels disposed at the left region of the image sensor unit 100 and optical information supplied to the second group pixels 10B has a high luminous intensity value at pixels disposed at the right region of the image sensor unit 100.

That is, as exemplarily shown in (c) of FIG. 5C, optical information supplied to the phase difference detection pixel 10A and optical information supplied to the phase difference detection pixel 10B have luminous intensity distributions leaned in opposite directions based on the central pixel C of the image sensor unit 100, and have an opposite tendency to that shown in (c) of FIG. 5B.

Further, in the same manner as the case of FIG. 5B, in the case of FIG. 5C, since light is not focused on one point on the image sensor unit 100, two unfocused images are generated, a phase difference may be acquired from the two images, and distance information of the subject O separated from the optical unit 110 may be acquired from the phase difference value between the two images.

Figure 6:
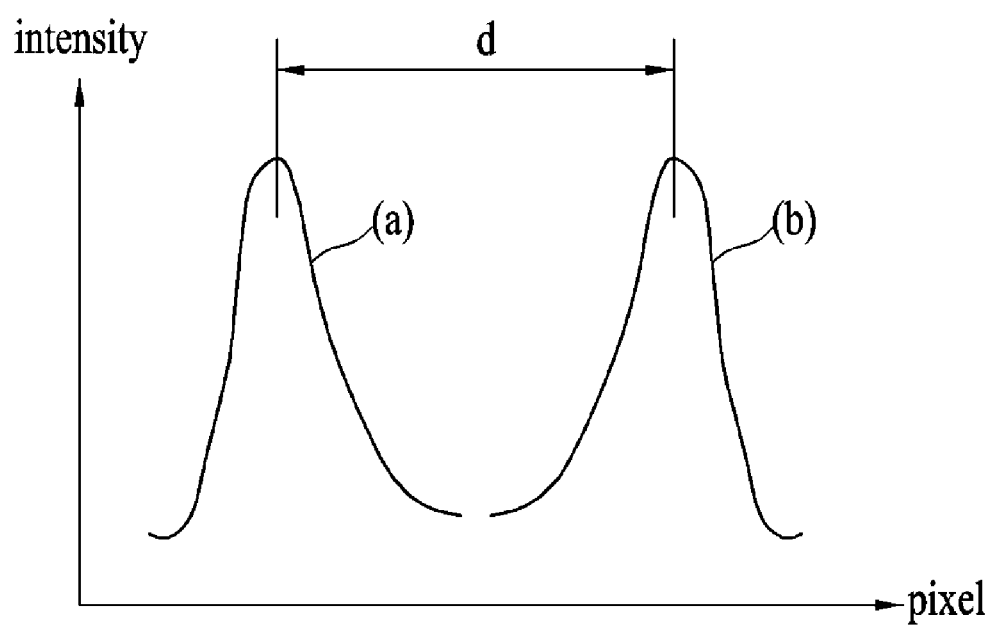
FIG. 6 is a graph illustrating a method for acquiring a phase difference from image information from phase difference detection pixels.

FIG. 6 is a graph illustrating a distribution of luminous intensity values of respective pixels of two different phase difference detection pixel groups 10A and 10B in brief.

In FIG. 6, the X axis represents positions of phase difference detection pixels and Y axis represents luminous intensity values of optical information supplied to the respective phase difference detection pixels.

In the graph of FIG. 6, curves (a) and (b) may be image information processed by the different phase detection pixel groups 10A and 10B, and a difference between pixels of the two curves (a) and (b) at points having the same luminous intensity value may be a phase difference value.

For example, a distance d between two points having the highest luminous intensity in the graph of FIG. 6 may correspond to a phase difference between the two phase difference detection pixel groups 10A and 10B.

Figure 7:
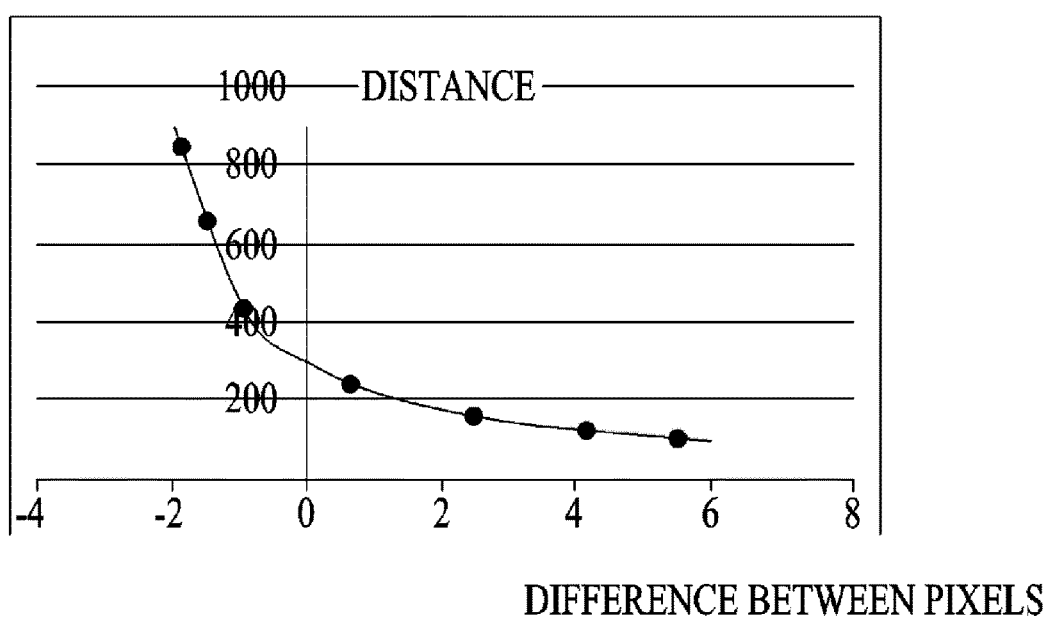
FIG. 7 is a graph illustrating distance information according to phase difference values in an imaging apparatus in accordance with one embodiment.

FIG. 7 is a graph illustrating relations between a phase difference value, i.e., a difference between pixels, and a distance to a subject.

FIG. 7 illustrates relations between a phase difference value and a distance to a subject in an image pick-up apparatus including a lens having a fixed focal distance of 300 mm in accordance with one embodiment. Here, if there is no phase difference, i.e., at a point having an X-axis value of 0, a distance to the subject may be 300 mm.

Therefore, if the image pick-up apparatus 200 including a lens having a fixed focal distance of 300 mm is used, among image information acquired from the two phase difference detection pixel groups 10A and 10B, distance information according to phase difference values may be confirmed from the graph shown in FIG. 7.

With reference to the graph shown in FIG. 7, as the subject is disposed at a shorter distance than the focal distance, a phase difference value between the two phase difference detection pixel groups gradually increases and, as the subject is disposed at a longer distance than the focal distance, the phase difference value gradually increases in the opposite direction so as to become a negative value.

Further, it may be understood from FIG. 7 that, when the subject is disposed at a position more distant from the image pick-up apparatus than the focal distance, variation of the phase difference value according to variation of the distance is small, as compared with when the subject is disposed at a position closer to the image pick-up apparatus than the focal distance. The reason for this is that variation of the angle of light, acquired from the subject by the optical unit, incident upon both sides of the lens of the optical unit, for example, left and right sides of the lens, gradually decreases as the distance to the subject increases.

Figure 8:
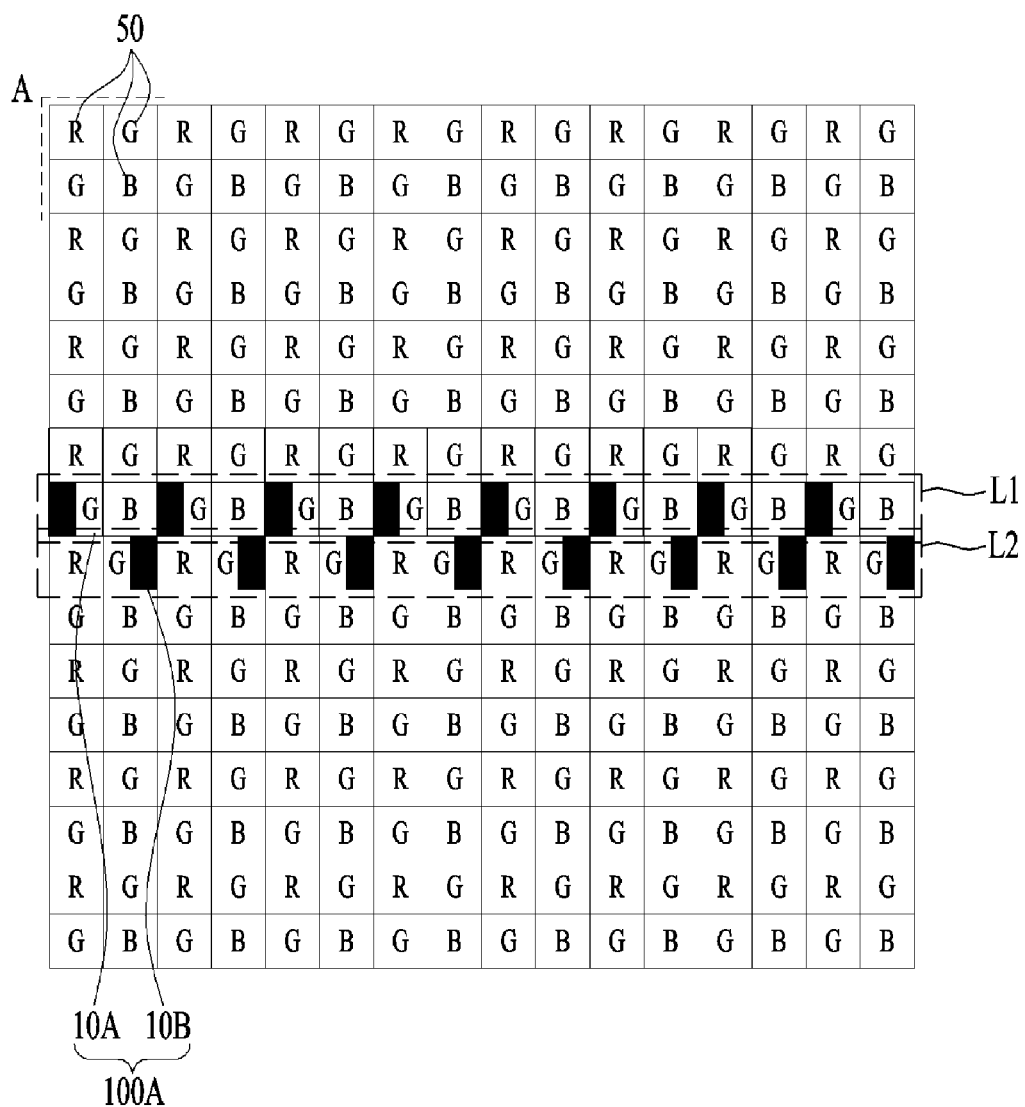
FIG. 8 is a view illustrating an image sensor unit in accordance with one embodiment.

FIG. 8 is a view illustrating the image sensor unit 100 in accordance with one embodiment.

The image sensor unit 100 is not limited to the illustrated pixel number and the total number of pixels included in the image sensor unit 100 may be larger or smaller than the illustrated pixel number.

The image sensor unit 100 may include a plurality of image detection pixels 50 disposed in a lattice pattern together with the phase difference detection pixels 10.

The image detection pixels 50 may be pixels which generate an electrical signal to generate image information of a captured picture.

As the image detection pixels 50, a plurality of color pixels may form a lattice unit A and such a lattice unit A may be repeated to form a lattice pattern. The color pixels may include red, green and blue pixels but are not limited thereto.

Although, in FIG. 8, R, G and B represents red, green and blue pixels and the lattice unit A has a Bayer arrangement in which four pixels are disposed in 2 rows and 2 columns, the lattice unit forming the lattice pattern may be an array disposed in 3 rows and 3 columns or an array disposed in 4 rows and 4 columns, but is not limited thereto.

If the lattice unit A of the image detection pixels 50 disposed in 2 rows and 2 columns is repeated to form a lattice pattern, among four pixels forming the lattice unit A, G pixels are provided as two pixels diagonally facing each other and R and B pixels are provided as the remaining two pixels.

The phase difference detection pixels 10 may be disposed at the positions of the G pixels in the lattice unit A of the image detection pixels 50.

In the image sensor unit 100 in accordance with the embodiment, the first group pixels 10A may be separated from each other by a designated interval in the row direction and disposed in a first arrangement line L1, the second group pixels 10B are separated from each other by a designated interval in the row direction and disposed in a second arrangement line L2, and the first arrangement line L1 and the second arrangement line L2 may intersect each other in the column direction.

However, the disposition of the phase difference detection pixels 10 of the image sensor unit 100 is not limited to the above-described arrangement shown in FIG. 8, the separation interval of the first group pixels 10A and the second group pixels 10B and the disposition shape of the first group pixels 10A and the second group pixels 10B may be variously modified.

Further, in the image pick-up apparatus 200 in accordance with the embodiment shown in FIG. 1, the image information output unit 190 may output image information generated by the image detection pixels 50 together with image information of the phase difference detection pixels 10.

That is, the image output unit 190 may output a depth value calculated from a phase difference value, output a depth map image in which the depth value is mapped, and output image information of the subject generated from the image detection pixels 50.

In the image pick-up apparatus 200 in accordance with this embodiment, the image sensor unit 100 includes a plurality of phase difference detection pixels 10 and, thus, two pieces of image information may be acquired in the same manner as use of a stereo camera. Further, a phase difference is detected from the two pieces of image information and, thus, a depth value corresponding to the phase difference may be acquired from data stored in the memory unit 150 and the depth value and a depth map may be easily acquired.

For example, if a camera having the image sensor unit 100 including the phase difference detection pixels 10 in accordance with this embodiment is used, depth or distance information for a 3D image may be acquired without two cameras.

Hereinafter, a portable terminal having the above-described image pick-up apparatus 200 and an image pick-up method using the image pick-up apparatus 200 will be described with reference to the accompanying drawings. However, the disclosure is not limited thereto.

Figure 9:
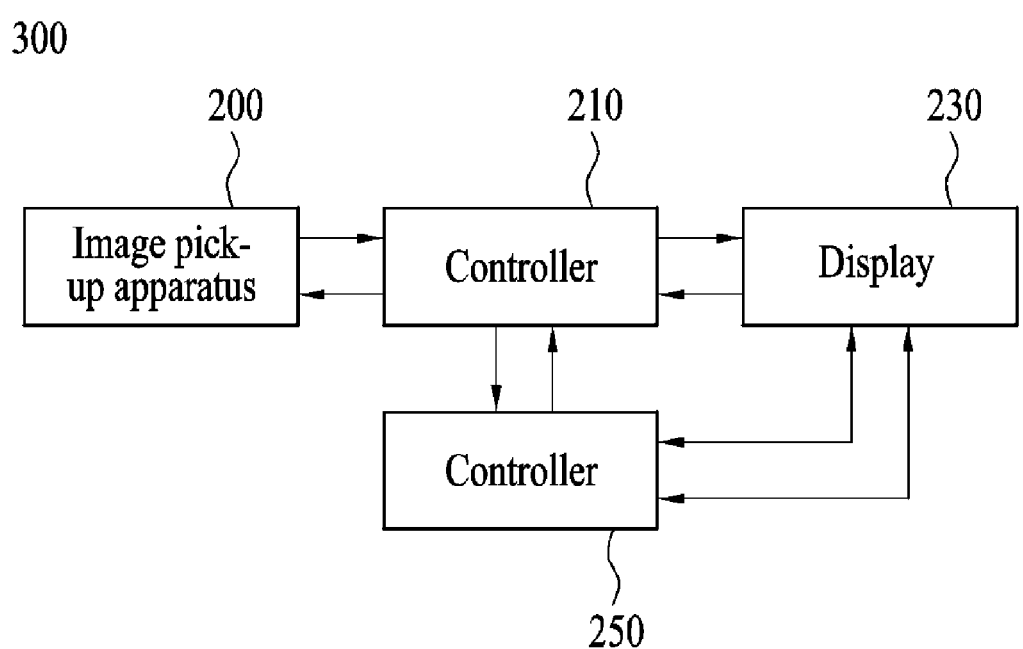
FIG. 9 is a block diagram of a portable terminal in accordance with one embodiment.

FIG. 9 is a block diagram of a portable terminal 300 in accordance with one embodiment.

The portable terminal 300 in accordance with this embodiment may include the above-described image pick-up apparatus 200, a display 230 to display an image including a depth value output from the image pick-up apparatus 200, and an input unit 250 to adjust operation of the image pick-up apparatus 200.

The portable terminal 300 may further include a controller 210 to transmit information input from the image pick-up apparatus 200 to the display 230 so as to output the information to the outside, or to provide information regarding a distance value of the image pick-up apparatus 200 so as to use the information for the purpose of execution of other functions of the portable terminal 300.

The controller 210 may output the distance value and the image information so as to store the output distance value and image information within a memory of the portable terminal 300 or to use the output distance value and image information together with other information stored in the portable terminal 300.

The controller 210 may control overall operation of the portable terminal 300 and, for example, display image information acquired by the image pick-up apparatus 200 through the display 230 and form a database of the depth or distance value acquired by the image pick-up apparatus 200 so as to use such information in combination with other information input through the controller 210.

The display 230 may be a device to display an image acquired by the image pick-up apparatus 200 so that a user may confirm the image, and be disposed on the front surface of the portable terminal 300. The display may include a liquid crystal display (LCD) or an organic light emitting diode (OLED), but is not limited thereto.

The input unit 250 may adjust operation of the portable terminal 300 including the image pick-up apparatus 200 and the display 230 and include a touch input unit or a button input unit. In order to input information through the input unit 250, various methods including a touch input method, a tap input method, a drag input method, a gesture input method, etc., may be used and any method which may adjust operation of the portable terminal 300 may be used without limitation.

Figure 10:
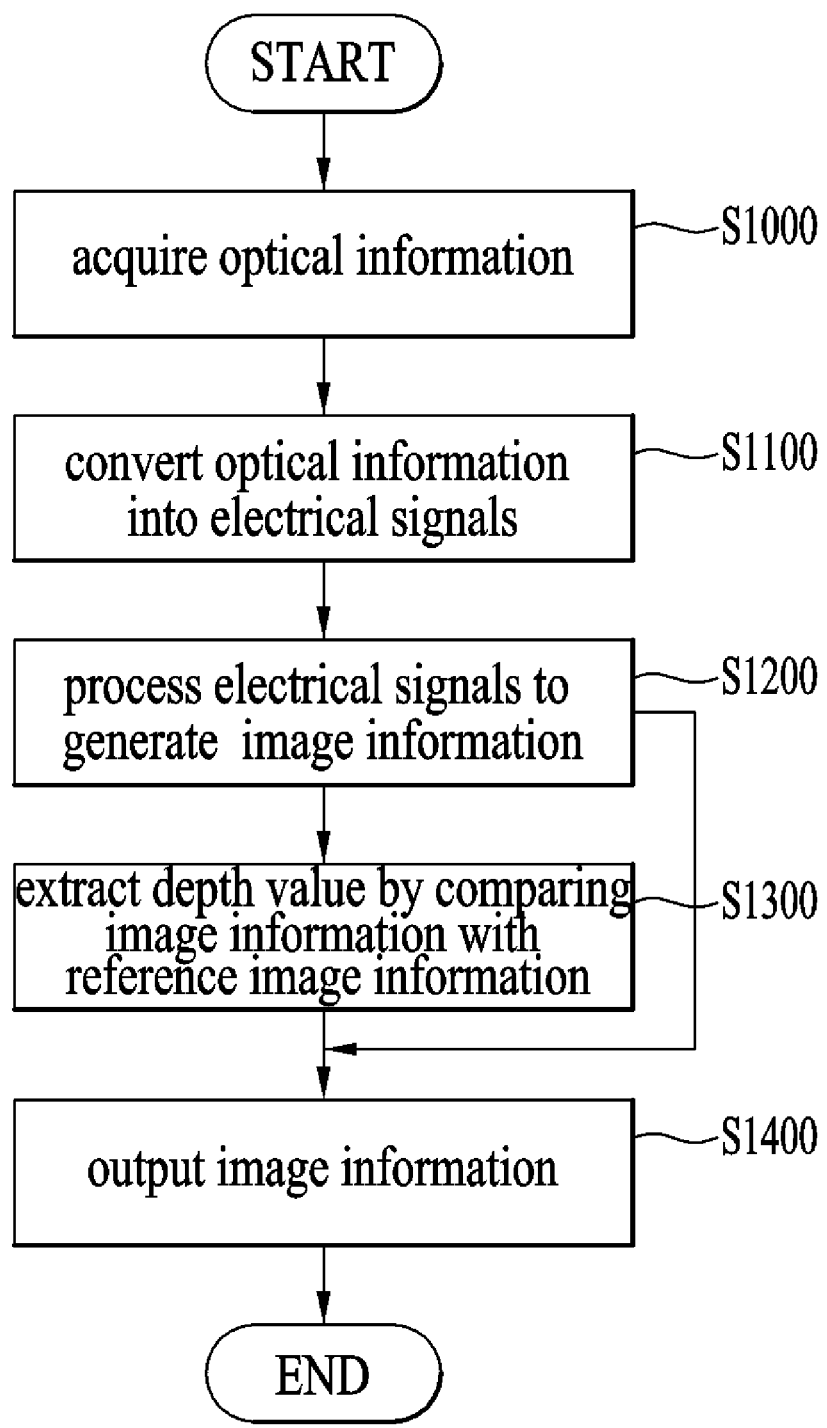
FIG. 10 is a flowchart illustrating an image pick-up method in accordance with one embodiment.

FIG. 10 is a flowchart illustrating an image pick-up method in accordance with one embodiment. With reference to FIG. 10, the image pick-up method in accordance with this embodiment may include acquiring optical information (Operation S1000), converting the optical information into electrical signals (Operation S1100), processing the converted electrical signals to form image information (Operation S1200), extracting a depth value by comparing the image information with reference image information (Operation S1300), and outputting the image information (Operation S1400).

In Operation S1000, an optical signal output from the optical unit 110 of the image pick-up apparatus 200 in accordance with the embodiment may be generated.

In Operation S1100, optical information output from the optical unit 110 may be input to the image sensor unit 100 and the image sensor unit 100 may convert the optical information into electrical signals.

In conversion of the optical information into the electrical signals by the image sensor unit 100, optical information input to the image detection pixels 50 and the phase difference detection pixels 10 may be converted into electrical signals.

In Operation S1200, the electrical signals converted by the image sensor unit 100 may be processed to form image information for phase difference detection to acquire image information and depth information.

In Operation S1300, the image information of the phase difference detection pixels 10 processed in Operation S1200 may be compared with reference image information stored in the memory unit 150 of the image pick-up apparatus 200 and a depth value corresponding to the image information may be searched for and extracted from the look-up table stored in the memory unit 150.

In Operation S1400, the extracted image information may be provided. That is, the depth value of the processed image information of the phase difference detection pixels 10 may be provided and the image information of the image detection pixels 50 may be provided.

Further, if the depth value is provided in Operation S1400, a depth map in which the depth value is mapped may be provided.

In the image pick-up method in accordance with this embodiment, since a phase difference value of a subject may be extracted from image information processed by the image sensor unit 100 including the phase difference detection pixels 10 and depth information of the subject may be acquired by comparing the image information with reference image information stored in the memory unit 150, a depth map may be acquired from one image pick-up apparatus, as compared with a conventional method in which a depth map is acquired using a stereo camera.

That is, in the embodiment, 3D image information of a subject may be easily acquired using only one image pick-up apparatus.

As apparent from the above description, an image pick-up apparatus in accordance with one embodiment includes a plurality of phase difference detection pixels in an image sensor unit and thus may pick up depth information of a subject from a phase difference value acquired by the phase difference detection pixels. Further, in an image pick-up method using the image pick-up apparatus, a depth map may be easily acquired without use of two cameras.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image pick-up apparatus comprising:
   an optical unit configured to output optical information acquired from a lens having a fixed focal distance;
   an image sensor unit configured to convert the optical information into electrical signals and including a plurality of color pixels, wherein each of particular color pixels of the plurality of color pixels comprises a shielded region to serve as phase difference detection pixels;
an image information processing unit configured to generate interest image information by processing the electrical signals converted by the image sensor unit;
a memory unit configured to store depth values matched with reference image information;
a calculation unit configured to extract the depth value matched with the reference image information corresponding to the interest image information; and
an image information output unit configured to output the depth value extracted by the calculation unit;
wherein each of the particular color pixels further comprises:
a photodiode;
a mask layer disposed over the photodiode and spaced apart from the photodiode; and
a micro-lens disposed over the mask layer;
wherein the photodiode, the mask layer, and the micro-lens are aligned at a side of their respective particular color pixel; and
wherein at least two color pixels of the plurality of color pixels have micro-lenses inclined at different angles with respect to a corresponding mask lam of the color pixel.

2. The image pick-up apparatus according to claim 1, wherein the phase difference detection pixels include:
a first group pixels, each having the shielded region deviated to one side thereof; and
a second group pixels, each having the shielded region deviated to the other side thereof.

3. The image pick-up apparatus according to claim 2, wherein the interest image information includes a phase difference between a first electrical signal of the first group pixels and a second electrical signal of the second group pixels having the same luminous intensity level.

4. The image pick-up apparatus according to claim 2, wherein the first group pixels are separated from each other by a designated interval in the row direction and disposed in a first arrangement line, the second group pixels are separated from each other by a designated interval in the row direction and disposed in a second arrangement line, and the first arrangement line and the second arrangement line intersect each other in the column direction.

5. The image pick-up apparatus according to claim 1, wherein the plurality of color pixels are disposed in a lattice pattern,
wherein the plurality of color pixels comprises:
a plurality of first lattice units, each including a first red pixel, two first green pixels, and a first blue pixel, all generating image information; and
a plurality of second lattice units, each including a second red pixel and a second blue pixel, each generating the image information, and two second green pixels which are served as the phase difference detection pixels and generate the image information.

6. The image pick-up apparatus according to claim 5, wherein the image information output unit outputs the image information generated by the plurality of color pixels, and
wherein the second green pixels are diagonally faced with each other in each second lattice unit.

7. The image pick-up apparatus according to claim 1, wherein the image information output unit outputs a depth map including the depth value extracted by the calculation unit.

8. A portable terminal comprising:
an optical unit configured to output optical information acquired from a lens having a fixed focal distance;
an image sensor unit configured to convert the optical information into electrical signals and including a plurality of color pixels, wherein each of particular color pixels of the plurality of color pixels comprises a shielded region to serve as phase difference detection pixels;
an image information processing unit configured to generate interest image information by processing the electrical signals converted by the image sensor unit;
a memory unit configured to store depth values matched with reference image information;
a calculation unit configured to extract the depth value matched with the reference image information corresponding to the interest image information;
an image information output unit configured to output the depth value extracted by the calculation unit; and
a display device configured to display an image including the depth value output from the image information output unit;
wherein each of the particular color pixels further comprises:
a photodiode;
a mask layer disposed over the photodiode and spaced apart from the photodiode; and
a micro-lens disposed over the mask layer;
wherein the photodiode, the mask layer, and the micro-lens are aligned at a side of their respective particular color pixel; and
wherein at least two color pixels of the plurality of color pixels have micro-lenses inclined at different angles with respect to a corresponding mask layer of the color pixel.

9. The portable terminal according to claim 8, wherein the phase difference detection pixels include:
a first group pixels, each having the shielded region deviated to one side thereof; and
a second group pixels, each having the shielded region deviated to the other side thereof.

10. The portable terminal according to claim 9, wherein the interest image information includes a phase difference between a first electrical signal of the first group pixels and a second electrical signal of the second group pixels having the same luminous intensity level.

11. The portable terminal according to claim 9, wherein the first group pixels are separated from each other by a designated interval in the row direction and disposed in a first arrangement line, the second group pixels are separated from each other by a designated interval in the row direction and disposed in a second arrangement line, and the first arrangement line and the second arrangement line intersect each other in the column direction.

12. The portable terminal according to claim 8, wherein the plurality of color pixels are disposed in a lattice pattern together,
wherein the plurality of color pixels comprises:
a plurality of first lattice units, each including a first red pixel, two first green pixels, and a first blue pixel, all generating image information; and
a plurality of second lattice units, each including a second red pixel and a second blue pixel, each generating the image information, and two second green pixels which are served as the phase difference detection pixels and generate the image information.

13. The portable terminal according to claim 12, wherein the image information output unit outputs the image information generated by the plurality of color pixels, and
wherein the second green pixels are diagonally faced with each other in each second lattice unit.

14. An image pick-up method using an image pick-up apparatus comprising:
an optical unit configured to output optical information acquired from a lens having a fixed focal distance;
an image sensor unit configured to convert the optical information into electrical signals and including a plurality of color pixels, wherein each of particular color pixels of the plurality of color pixels comprises a shielded region to serve as phase difference detection pixels;
an image information processing unit configured to generate interest image information by processing the electrical signals converted by the image sensor unit;
a memory unit configured to store depth values matched with reference image information;
a calculation unit configured to extract the depth value matched with the reference image information corresponding to the interest image information; and
an image information output unit configured to output the depth value extracted by the calculation unit,
the image pick-up method comprising:
acquiring optical information;
converting the optical information into electrical signals;
processing the converted electrical signals to generate the interest image information;
extracting a corresponding depth value by comparing the interest image information with the reference image information stored in the memory; and
providing the extracted depth value;
wherein each of the particular color pixels further comprises:
a photodiode;
a mask layer disposed over the photodiode and spaced apart from the photodiode; and
a micro-lens disposed over the mask layer;
wherein the photodiode, the mask layer, and the micro-lens are aligned at a side of their respective particular color pixel;
wherein at least two color pixels of the plurality of color pixels have micro-lenses inclined at different angles with respect to a corresponding mask layer of the color pixel.

15. The image pick-up method according to claim 14, wherein, in provision of the extracted depth value, a depth map using the extracted depth value is provided.

16. The image pick-up method according to claim 14, wherein the phase difference detection pixels include:
a first group pixels, each having the shielded region deviated to one side thereof; and
a second group pixels, each having the shielded region deviated to the other side thereof.

17. The image pick-up method according to claim 16, wherein the interest image information includes a phase difference between a first electrical signal of the first group pixels and a second electrical signal of the second group pixels having the same luminous intensity level.

18. The image pick-up method according to claim 16, wherein the first group pixels are separated from each other by a designated interval in the row direction and disposed in a first arrangement line, the second group pixels are separated from each other by a designated interval in the row direction and disposed in a second arrangement line, and the first arrangement line and the second arrangement line intersect each other in the column direction.

19. The image pick-up method according to claim 14, wherein the plurality of color pixels are disposed in a lattice pattern,
wherein the plurality of color pixels comprises:
a plurality of first lattice units, each including a first red pixel, two first green pixels, and a first blue pixel, all generating image information; and
a plurality of second lattice units, each including a second red pixel and a second blue pixel, each generating the image information, and two second green pixels which are served as the phase difference detection pixels and generate the image information.

20. The image pick-up method according to claim 19, wherein the image information output unit outputs the image information generated by the plurality of color pixels, and wherein the second green pixels are diagonally faced with each other in each second lattice unit.

* * * * *